(12) United States Patent
Ou et al.

(10) Patent No.: US 12,724,730 B2
(45) Date of Patent: Sep. 1, 2026

(54) DEBUGGING SYSTEM AND A DRIVER ADAPTABLE THERETO

(71) Applicant: Himax Technologies Limited, Tainan City (TW)

(72) Inventors: Yu-Nian Ou, Tainan City (TW); Chun-Kai Chuang, Tainan City (TW); Pei-Yuan Hung, Tainan City (TW); Yu-Hsiang Lin, Tainan City (TW)

(73) Assignee: Himax Technologies Limited, Tainan City (TW)

( * ) Notice: Subject to any disclaimer, the term of this patent is extended or adjusted under 35 U.S.C. 154(b) by 0 days.

(21) Appl. No.: 18/141,367

(22) Filed: Apr. 29, 2023

(65) Prior Publication Data

US 2024/0362174 A1 Oct. 31, 2024

(51) Int. Cl.

| | |
|---|---|
| ***G06F 13/20*** | (2006.01) |
| ***B60K 35/00*** | (2024.01) |
| ***G06F 11/22*** | (2006.01) |
| ***G06F 11/273*** | (2006.01) |
| ***G06F 11/34*** | (2006.01) |
| ***G06F 11/362*** | (2025.01) |
| ***G06F 11/3668*** | (2025.01) |
| ***G06F 11/3698*** | (2025.01) |
| ***G06F 13/42*** | (2006.01) |

(52) U.S. Cl.

CPC .......... *G06F 13/20* (2013.01); *G06F 2213/40* (2013.01)

(58) Field of Classification Search

CPC .. G01R 31/318314; G06F 1/3215; G06F 8/65

See application file for complete search history.

(56) References Cited

U.S. PATENT DOCUMENTS

| | | | | |
|---|---|---|---|---|
| 6,011,920 | A | 1/2000 | Edwards et al. | |
| 6,145,093 | A | 11/2000 | Shiga | |
| 2016/0034065 | A1* | 2/2016 | Yin | G06F 3/0416 345/174 |
| 2017/0003785 | A1* | 1/2017 | Berget | G06F 3/0445 |
| 2017/0061708 | A1* | 3/2017 | Sol | G06F 8/65 |
| 2018/0284938 | A1* | 10/2018 | Montero | G06F 1/3215 |
| 2020/0225296 | A1 | 7/2020 | Wang et al. | |
| 2021/0109840 | A1 | 4/2021 | Zou | |

(Continued)

FOREIGN PATENT DOCUMENTS

| | | | |
|---|---|---|---|
| CN | 113676326 | A | 11/2021 |
| CN | 115442224 | A | 12/2022 |

(Continued)

OTHER PUBLICATIONS

Office Action Dated Jul. 5, 2024 in corresponding Taiwan Patent Application No. 113100760.

(Continued)

*Primary Examiner* — Getente A Yimer

(74) *Attorney, Agent, or Firm* — Stout, Uxa & Buyan, LLP; Donald E. Stout

(57) ABSTRACT

A driver adaptable to a debugging system includes a driver controller, and a driver general-purpose input and output (GPIO) controlled by the driver controller. The driver GPIO directly transfers a debug log of status messages of a touchscreen to a host general-purpose input and output (GPIO) of a host without handshaking between the driver and the host.

14 Claims, 3 Drawing Sheets

(56) References Cited

U.S. PATENT DOCUMENTS

2022/0018901 A1 1/2022 Jones et al.
2022/0413047 A1* 12/2022 Jiang .............. G01R 31/318314
2022/0413766 A1* 12/2022 Yeh ....................... G06F 11/263

FOREIGN PATENT DOCUMENTS

JP 11-015697 A 1/1999
TW 202312129 A 3/2023

OTHER PUBLICATIONS

G. Fairhurst and T. Jones, "RFC 8304—Transport Features of the User Datagram Protocol (UDP) and Lightweight UDP (UDP-Lite)" Feb. 28, 2018, pp. 1-20, Retrieved from the Internet: URL: https://datatracker.ietf.org/doc/rfc8304/.

Anonymous, "Press Release | Synaptics Launches New TD7850 Automotive TDDI Solution for Touchscreens up to 15 inches," Synaptics, Jan. 6, 2020, pp. 1-4, Retrieved from the Internet: URL: https://www.synaptics.com/company/news/TD7850.

Extended European Search Report dated Jul. 3, 2024 in related European Application No. 24150854.8.

Office Action dated Apr. 15, 2025 in corresponding Japanese Patent Application No. 2024-016332.

Wei-Chi Lai, "Implementing a Software UART Using GPIO Pins", https://medium.com/@redmilk/%E4%BD%BF%E7%94%A8-gpio-%E5%AF%A6%E4%BD%9C-software-uart-737e217a1d99, Jun. 9, 2020.

"How to Output Debug Logs When No UART Port Is Available", https://mcu.eetrend.com/blog/2021/100556015.html, Dec. 9, 2021.

Office Action dated Mar. 6, 2026 in corresponding Taiwan Patent Application No. 113100760.

Office action dated Apr. 23, 2026 in related European Application No. 24150854.8.

* cited by examiner

| Baud rate | duration time |
|---|---|
| 921600 | 1.08 μs |
| 614400 | 1.62 μs |
| 460800 | 2.17 μs |
| 230400 | 4.34 μs |
| 115200 | 8.68 μs |
| 57600 | 17.36 μs |
| 38400 | 26.04 μs |
| 28800 | 34.72 μs |
| 19200 | 52.08 μs |
| 14400 | 69.44 μs |

DEBUGGING SYSTEM AND A DRIVER ADAPTABLE THERETO

BACKGROUND OF THE INVENTION

1. Field of the Invention

The present invention generally relates to a debugging system, and more particularly to a debugging system that is adaptable for use with an automotive touchscreen.

2. Description of Related Art

Automotive touchscreens have become increasingly popular as they replace traditional physical buttons in motor vehicles and allow users to control various functions in a car such as navigation, radio, climate and settings in more flexible and versatile manners.

However, electronic systems are more prone to errors and failures than physical buttons and thus require debugging (i.e., finding and resolving bugs or problems that prevent correct operation) to ensure that they are functioning properly and meeting the needs of users. Unfortunately, conventional debugging techniques cannot solve problems in real-time or remotely, especially with respect to the driver such as the touch and display driver integration (TDDI). TDDI is a technology that integrates display drivers and touch controllers into a single chip. In addition to TDDI, there are other technologies that require new debugging approaches. For example, system-on-chip (SoC) devices have become more complex, making it difficult to debug them using traditional methods.

Therefore, there is a need for a novel scheme that can overcome the drawbacks of conventional debugging techniques that are adaptable for use with an automotive touchscreen.

SUMMARY OF THE INVENTION

In light of the above, it is an objective of the present invention to provide a debugging system that can remotely obtain debug logs of status messages in real-time and remotely perform debugging.

According to one embodiment, a debugging system includes a driver and a host. The driver controls a touchscreen and includes a driver general-purpose input and output (GPIO). The host receives a debug log of status messages from the driver and includes a host general-purpose input and output (GPIO). The driver GPIO directly transfers the debug log to the host GPIO without handshaking between the driver and the host.

DETAILED DESCRIPTION OF THE INVENTION

Figure 1:
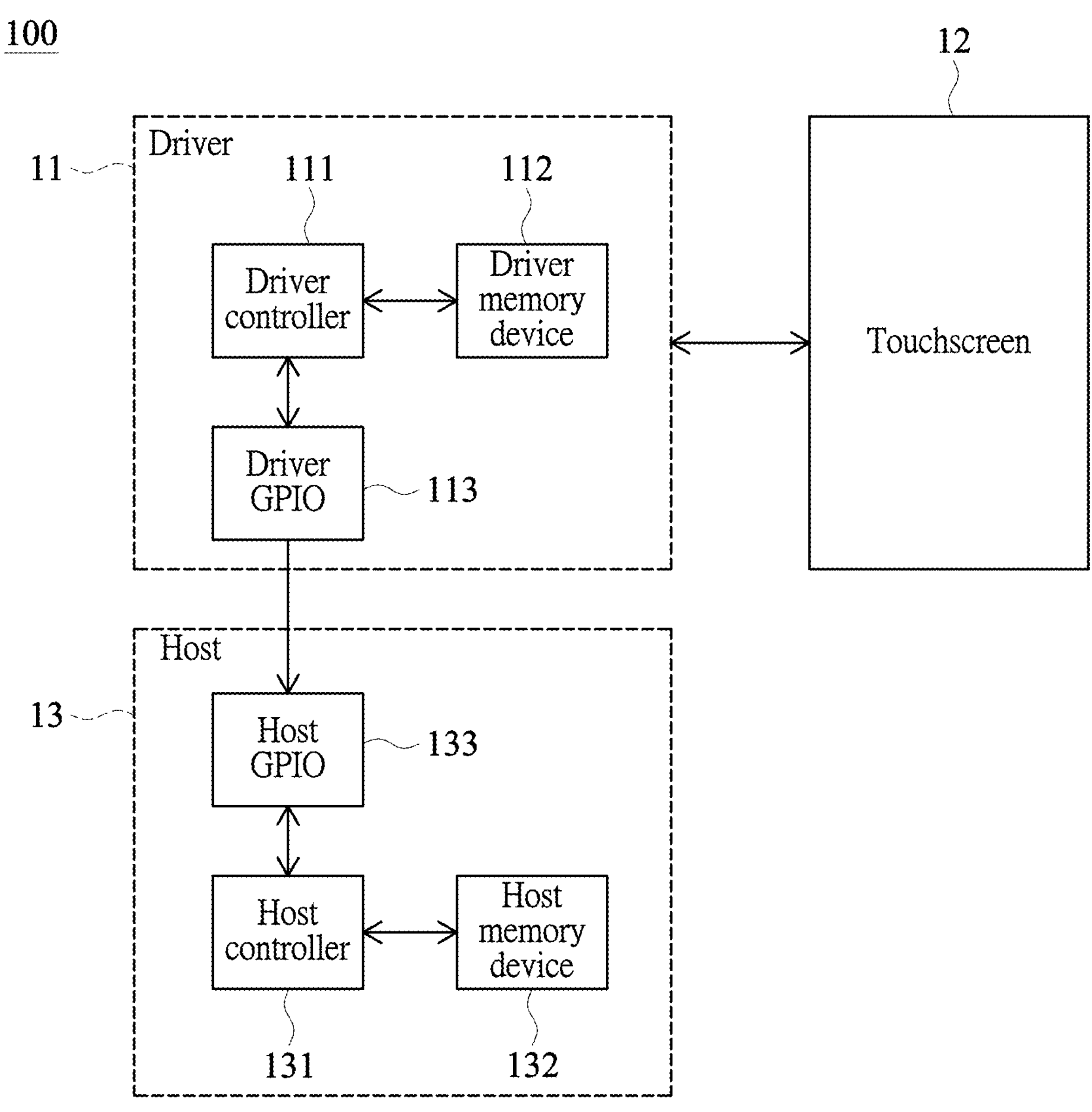
FIG. 1 shows a block diagram illustrating a debugging system according to one embodiment of the present invention.

FIG. 1 shows a block diagram illustrating a debugging system 100 according to one embodiment of the present invention. The debugging system 100 of the embodiment may be adaptable for use with an automotive touchscreen that allows users to control various functions in a car such as navigation, radio, climate and settings in automotive applications.

The debugging system 100 may include a driver 11 configured to control an (automotive) touchscreen 12. In the embodiment, the driver 11 may include a touch and display driver integration (TDDI) circuit that combines a touch driver and a display driver into one chip for controlling the touchscreen 12, such as an automotive touchscreen in the embodiment.

Specifically, the driver 11 of the embodiment may include a driver controller 111, such as a microcontroller unit (MCU), designed for embedded applications. The driver 11 may include a driver memory device 112, such as a static random-access memory (SRAM), configured to store data received from the driver controller 111 or to be transmitted to the driver controller 111. The driver 11 may include a driver general-purpose input and output (GPIO) 113 controlled by the driver controller 111. GPIO is a (digital) signal pin on the driver controller 111, and may be controllably used as an input or output.

The debugging system 100 may include a host 13 (for example, a personal computer) configured to receive a debug log containing status (or error) messages (from the driver 11) that help developers identify and fix errors. In the embodiment, the host 13 may be adopted as an automotive system (or application processor, AP) in automotive applications.

Specifically, the host 13 of the embodiment may include a host controller 131, such as a microcontroller unit (MCU), designed for embedded applications. The host 13 may include a host memory device 132, such as a dynamic random-access memory (DRAM), configured to store data received from the host controller 131 or to be transmitted to the host controller 131. The host 13 may include a host general-purpose input and output (GPIO) 133 controlled by the host controller 131. GPIO is a (digital) signal pin on the host controller 131, and may be controllably used as an input or output According to one aspect of the embodiment, the driver GPIO 113 (of the driver 11) may be configured to directly transfer the debug log of status messages to the host GPIO 133 (of the host 13) via a bus in a unidirectional manner (for example, without (prior) handshaking between the driver 11 and the host 13).

In one embodiment, the status messages may be encoded by American Standard Code for Information Interchange (ASCII) encoding that uses eight bits to represent alphabetic characters, numerical digits and symbols. For example, alphabetic character "A" may be represented in ASCII encoding by binary 01000001 (or hexadecimal 41 or decimal 65).

Figures 2A, 2B, 2C:
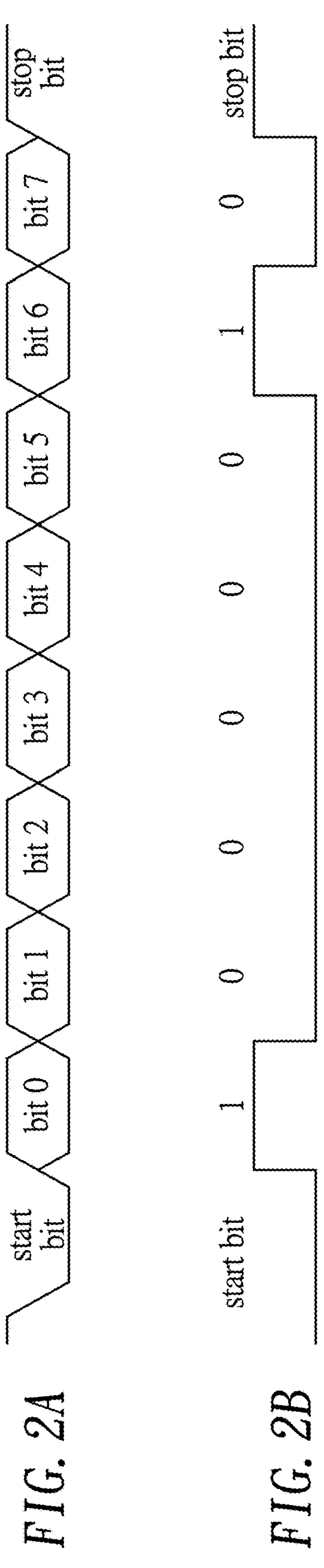
FIG. 2A shows an exemplary UART data format.
FIG. 2B shows an exemplary waveform for transferring alphabetic character "A" by using UART protocol.
FIG. 2C shows some transmission speeds in baud rate and associated duration times.

In the embodiment, the driver GPIO 113 and the host GPIO 133 may adopt asynchronous serial communication (without requiring a clock signal for synchronization), such as universal asynchronous receiver-transmitter (UART) protocol, to transfer the status messages from the driver GPIO 113 to the host GPIO 133 one bit by one bit, framed by a start bit and a stop bit. Subsequently, the status messages may then be displayed on the touchscreen 12. FIG. 2A shows an exemplary UART data format, and FIG. 2B shows an exemplary waveform for transferring alphabetic character "A" by using UART protocol.

In the embodiment, the status messages may be transferred in UART protocol with different transmission speeds. FIG. 2C shows some transmission speeds in baud rate (or bits per second) and associated duration times.

Figure 3:
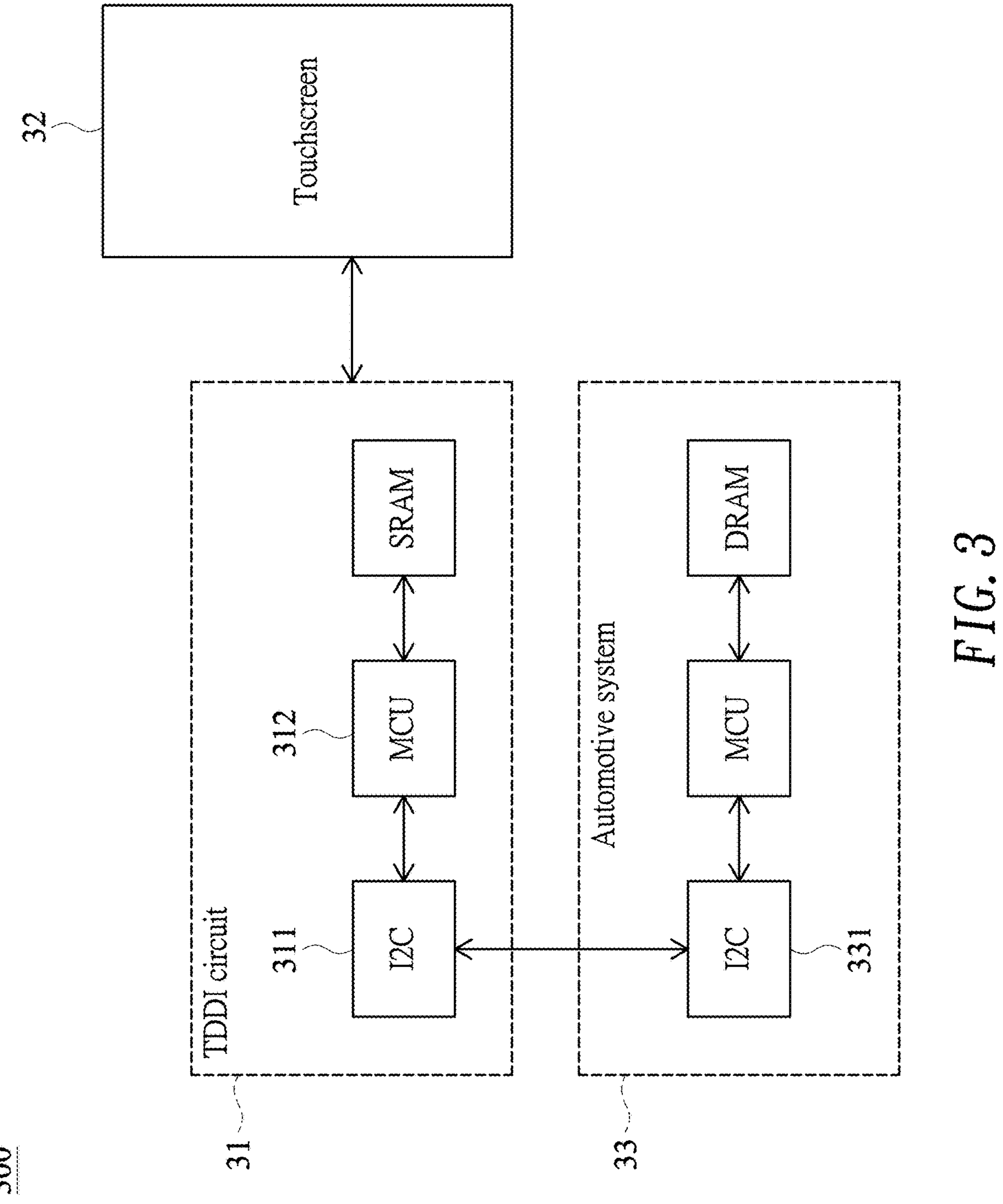
FIG. 3 shows a block diagram illustrating a debugging system without adopting the scheme of FIG. 1.

FIG. 3 shows a block diagram illustrating a debugging system 300 without adopting the scheme of FIG. 1. In operation, the inter-integrated circuit (I2C) 331 of the automotive system 33 sends an access command to the inter-integrated circuit (I2C) 311 of the TDDI circuit 31. Next, the access command is parsed (or analyzed) by the I2C 311, and is then executed by the microcontroller unit (MCU) 312 of the TDDI circuit 31, thereby transferring a status message to the I2C 331 of the automotive system 33. The status message may then be displayed on the touchscreen 32. Accordingly, communication link between the TDDI circuit 31 and the automotive system 33 need be established through exchanging the handshaking signal (or the access command) before transferring each status message.

Compared to the debugging system 300 (FIG. 3), the debugging system 100 (FIG. 1) of the embodiment can obtain the debug log of status messages in real time, while the debugging system 300 can only obtain the status messages in a passive manner due to handshaking between the TDDI circuit 31 and the automotive system 33. Further, upon receiving the debug log, the debugging system 100 of the embodiment can remotely detect the bug, if any, and update firmware of the driver 11 if required, thereby accomplishing remote debugging, while the debugging system 300 can only perform on-site debugging.

Although specific embodiments have been illustrated and described, it will be appreciated by those skilled in the art that various modifications may be made without departing from the scope of the present invention, which is intended to be limited solely by the appended claims.

What is claimed is:

1. A driver adaptable to a debugging system, the driver comprising:

a driver controller; and a driver general-purpose input and output (GPIO) controlled by the driver controller;

wherein the driver GPIO directly transfers a debug log of status messages of a touchscreen to a host general-purpose input and output (GPIO) of a host without handshaking between the driver and the host;

wherein the driver voluntarily and automatically transfers the debug log of status messages to the host in real time without debugging request;

wherein the host comprises: a host controller; and a host memory device that stores data received from the host controller or to be transmitted to the host controller.

2. The driver of claim 1, further comprising a touch and display driver integration (TDDI) circuit.

3. The driver of claim 1, wherein the touchscreen comprises an automotive touchscreen.

4. The driver of claim 1, further comprising: a driver memory device that stores data received from the driver controller or to be transmitted to the driver controller.

5. The driver of claim 1, wherein the status messages are encoded by American Standard Code for Information Interchange (ASCII) encoding.

6. The driver of claim 1, wherein the driver GPIO and the host GPIO adopt asynchronous serial communication.

7. The driver of claim 6, wherein the asynchronous serial communication adopts universal asynchronous receiver-transmitter (UART) protocol.

8. A debugging system, comprising:

a driver that controls a touchscreen, the driver including a driver general-purpose input and output (GPIO); and a host that receives a debug log of status messages from the driver, the host including a host general-purpose input and output (GPIO); wherein the driver GPIO directly transfers the debug log to the host GPIO without handshaking between the driver and the host;

wherein the driver voluntarily and automatically transfers the debug log of status messages to the host in real time without debugging request;

wherein the host comprises: a host controller; and a host memory device that stores data received from the host controller or to be transmitted to the host controller.

9. The debugging system of claim 8, wherein the driver comprises a touch and display driver integration (TDDI) circuit.

10. The debugging system of claim 8, wherein the touchscreen comprises an automotive touchscreen.

11. The debugging system of claim 8, wherein the driver comprises:

a driver controller; and a driver memory device that stores data received from the driver controller or to be transmitted to the driver controller.

12. The debugging system of claim 8, wherein the status messages are encoded by American Standard Code for Information Interchange (ASCII) encoding.

13. The debugging system of claim 8, wherein the driver GPIO and the host GPIO adopt asynchronous serial communication.

14. The debugging system of claim 13, wherein the asynchronous serial communication adopts universal asynchronous receiver-transmitter (UART) protocol.

* * * * *